(12) United States Patent
Narita et al.

(10) Patent No.: US 7,868,058 B2
(45) Date of Patent: *Jan. 11, 2011

(54) WATER-BASED INK

(75) Inventors: Masayuki Narita, Wakayama (JP); Shigemi Wakabayashi, Wakayama (JP)

(73) Assignee: Kao Corporation, Tokyo (JP)

( * ) Notice: Subject to any disclaimer, the term of this patent is extended or adjusted under 35 U.S.C. 154(b) by 77 days.

This patent is subject to a terminal disclaimer.

(21) Appl. No.: 10/740,619

(22) Filed: Dec. 22, 2003

(65) Prior Publication Data

US 2004/0132863 A1 Jul. 8, 2004

(30) Foreign Application Priority Data

Dec. 25, 2002 (JP) ............................. 2002-373656

(51) Int. Cl.
- *C08G 61/08* (2006.01)
- *C08J 3/00* (2006.01)
- *C08K 9/00* (2006.01)
- *C08L 31/00* (2006.01)
- *C08L 33/00* (2006.01)
- *C08L 55/00* (2006.01)
- *C09D 5/02* (2006.01)
- *C09D 11/00* (2006.01)

(52) U.S. Cl. .................. 523/160; 106/31.27; 523/161; 523/200; 523/205; 524/553; 524/556

(58) Field of Classification Search ............. 106/31.27; 523/160, 161, 200, 205; 524/553, 556

See application file for complete search history.

(56) References Cited

U.S. PATENT DOCUMENTS

| | | | |
|---|---|---|---|
| 4,246,154 A | 1/1981 | Yao | |
| 4,289,678 A * | 9/1981 | Calder et al. | ................. 524/273 |
| 5,545,678 A | 8/1996 | Giencke et al. | |
| 5,616,634 A | 4/1997 | Pfeil et al. | |
| 5,912,280 A | 6/1999 | Anton et al. | |
| 6,153,001 A * | 11/2000 | Suzuki et al. | ............ 106/31.65 |
| 6,184,268 B1 * | 2/2001 | Nichols et al. | ............... 523/160 |
| 6,613,814 B2 * | 9/2003 | Ishizuka et al. | ............. 523/160 |
| 6,642,307 B1 * | 11/2003 | Sogabe et al. | ................ 524/805 |
| 6,740,690 B2 * | 5/2004 | Nakano et al. | ............... 523/160 |
| 6,864,302 B2 * | 3/2005 | Miyabayashi | ............... 523/160 |
| 6,870,001 B2 * | 3/2005 | Wulff et al. | .................. 524/722 |

FOREIGN PATENT DOCUMENTS

| | | | |
|---|---|---|---|
| EP | 0 068 903 | | 1/1983 |
| EP | 0068903 | * | 1/1983 |
| EP | 0 647 662 | | 4/1995 |
| EP | 1 243 623 | | 9/2002 |
| JP | 55-139471 | | 10/1980 |
| JP | 2000-239582 | | 9/2000 |
| JP | 2001-123097 | | 5/2001 |
| JP | 2001-200183 A | | 7/2001 |
| JP | 2002-080746 A | | 3/2002 |
| JP | 2002-356602 A | | 12/2002 |

OTHER PUBLICATIONS

Machine Translation of JP 2002-080746 A (2002).*
Machine Translation of JP 2002-356602 A (2002).*
Machine Translation of JP 2002-200183 A (2001).*

* cited by examiner

*Primary Examiner*—Patrick D Niland
(74) *Attorney, Agent, or Firm*—Oblon, Spivak, McClelland, Maier & Neustadt, L.L.P.

(57) ABSTRACT

An aqueous dispersion of polymer particles of a water-insoluble vinyl polymer containing a hydrophobic dye, wherein the water-insoluble vinyl polymer is prepared by polymerizing a monomer composition comprising an alicyclic (meth)acrylate, a salt-forming group-containing monomer, and a monomer copolymerizable with the alicyclic (meth)acrylate and the salt-forming group-containing monomer; and an ink comprising the aqueous dispersion. The aqueous dispersion is excellent in, for instance, storage stability, and the ink is excellent in, for instance, printing reliability, solvent resistance, water resistance and character quality.

16 Claims, No Drawings

WATER-BASED INK

FIELD OF THE INVENTION

The present invention relates to a water-based ink. More specifically, the present invention relates to a water-based ink which can be suitably used, for instance, as a water-based ink for inkjet recording; and an aqueous dispersion used for the water-based ink.

BACKGROUND OF THE INVENTION

Inkjet recording is a recording system for forming characters or images, comprising directly jetting ink droplets from a very fine nozzle to a recording medium, and depositing the ink droplets on the recording medium. This system has some advantages such that not only the usable device shows excellent operability at a low level of noise, but also the coloration is facilitated and a plain sheet of paper can be used as a recording medium. Therefore, in recent years, this system has been widely used in inkjet printers.

As the colorants for use in inkjet printers, from the viewpoints of color development and jetting reliability, water-soluble dyes have been mainly used. However, the water-soluble dyes are poor in water resistance, so that feathering occurs in the printouts.

Therefore, for the purpose of improving the water resistance and character quality, as an ink containing an aqueous dispersion of polymer particles containing a hydrophobic dye, (i) an ink containing an oil-in-water emulsion made of a solution of a hydrophobic dye and vinyl polymer particles as disclosed in Japanese Patent Laid-Open No. 54-58504, (ii) an ink containing water-insoluble vinyl polymer latex particles which are impregnated with a disperse dye by heating as disclosed in Japanese Patent Laid-Open No. 55-139471, and (iii) an ink containing polymer latex particles containing a hydrophobic dye as disclosed in Japanese Patent Laid-Open No. 58-2366.

However, in the above inks (i) and (ii), when printing is performed for a long period of time using an ink containing polymer particles having as a major component a linear alkyl (meth)acrylate and an aromatic (meth)acrylate, a film derived from the polymer particles is formed on the head and the ink outlet of a printer, which may cause blurriness or distortion in the printout, and thus printing reliability may be impaired.

Also, in the above ink (iii), there is a defect that the optical density and character quality, in particular, sharpness of printed characters and images, are not sufficient.

Further, in the above inks (i), (ii) and (iii), there are defects that the storage stability of the aqueous dispersion of polymer particles is not sufficient; that the solvent resistance of the aqueous dispersion to a solvent formulated in the ink is not sufficient; that the particle diameter of the aqueous dispersion is large; and that the viscosity of the ink is high.

SUMMARY OF THE INVENTION

The present invention relates to an aqueous dispersion excellent in, for instance, storage property, and a water-based ink excellent in, for instance, printing reliability, solvent resistance, water resistance and character quality.

DETAILED DESCRIPTION OF THE INVENTION

The present invention relates to:
(1) an aqueous dispersion of polymer particles of a water-insoluble vinyl polymer containing a hydrophobic dye, wherein the water-insoluble vinyl polymer is prepared by polymerizing a monomer composition comprising an alicyclic (meth)acrylate (a), a salt-forming group-containing monomer (b), and a monomer (c) copolymerizable with the alicyclic (meth)acrylate (a) and the salt-forming group-containing monomer (b); and
(2) an ink comprising an aqueous dispersion of polymer particles of a water-insoluble vinyl polymer containing a hydrophobic dye, wherein the water-insoluble vinyl polymer is prepared by polymerizing a monomer composition comprising an alicyclic (meth)acrylate (a), a salt-forming group-containing monomer (b), and a monomer (c) copolymerizable with the alicyclic (meth)acrylate (a) and the salt-forming group-containing monomer (b).

The "(meth)acryl" as referred to herein means "acryl" and/or "methacryl."

One of the major characteristics according to the present invention resides in that the alicyclic (meth)acrylate (a) is used in a water-insoluble vinyl polymer. It is thought that polymer particles of the water-insoluble vinyl polymer containing a hydrophobic dye easily form a film because the polymer particles have high film-forming property. However, the vinyl polymer, in which the alicyclic (meth)acrylate (a) is used, imparts excellent storage stability to its aqueous dispersion. When printing is performed using a water-based ink obtained by using such aqueous dispersion, stable printing reliability can be maintained for a long period of time because the film is least formed on the head or the ink jetting outlet of a printer.

Representative examples of the alicyclic (meth)acrylates include monocyclic (meth)acrylates, dicyclic (meth)acrylates, tricyclic or higher polycyclic (meth)acrylates and the like.

Representative examples of the monocyclic (meth)acrylates include cycloalkyl (meth)acrylates having an alkyl group of 3 to 10 carbon atoms, such as cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate and cyclodecyl (meth)acrylate, and the like. These monocyclic (meth)acrylates can be used alone or in admixture of at least two kinds.

Representative examples of the dicyclic (meth)acrylates include isobornyl (meth)acrylate, norbornyl (meth)acrylate, and the like. These dicyclic (meth)acrylates can be used alone or in admixture of at least two kinds.

Representative examples of the tricyclic (meth)acrylates include adamantyl (meth)acrylate and the like.

Among the alicyclic (meth)acrylates, at least one compound selected from the group consisting of the monocyclic (meth)acrylates, isobornyl (meth)acrylate, norbornyl (meth)acrylate and adamantyl (meth)acrylate, is preferable, and isobornyl (meth)acrylate and/or adamantyl (meth)acrylate are more preferable, from the viewpoint of maintaining stable printing reliability for a long period of time.

In the present invention, a monomer prepared by bonding an alicyclic compound other than the above-mentioned alicyclic (meth)acrylate to a (meth)acrylate or derivative thereof can also be used.

The alicyclic compound includes, for instance, monoterpenoids such as dihydro-α-terpineol, 1-methyl-4-isopropyl-3-cyclohexanol, menthol, 1-methyl-4-isopropyl-1,8-cyclohexanediol, 1-methyl-4-isopropyl-1,4-cyclohexanediol, santenol, thujyl alcohol, pinocampheol, fenchyl alcohol and isofenchyl alcohol, and the present invention is not limited to the exemplified ones.

The salt-forming group-containing monomer (b) includes cationic monomers and anionic monomers.

Representative examples of the cationic monomers include unsaturated tertiary amine monomers, unsaturated ammonium salt monomers, and the like.

The unsaturated tertiary amine monomers include, for instance, N,N-dimethylaminoethyl (meth)acrylate, N,N-dimethylaminopropyl (meth)acrylate, N,N-diethylaminoethyl (meth)acrylate, N,N-dimethylaminopropyl (meth)acrylamide, an N,N-dimethylarylamine, vinylpyrrolidone, 2-vinylpyridine, 4-vinylpyridine, 2-methyl-6-vinylpyridine, 5-ethyl-2-vinylpyridine and the like. These monomers can be used alone or in admixture of at least two kinds.

The unsaturated ammonium salt monomers includes, for instance, quaternarized N,N-dimethylaminoethyl (meth) acrylate, quaternarized N,N-diethylaminoethyl (meth)acrylate, quaternarized N,N-dimethylaminopropyl (meth)acrylate and the like. These monomers can be used alone or in admixture of at least two kinds.

Representative examples of the anionic monomers include unsaturated carboxylic acid monomers, unsaturated sulfonic acid monomers, unsaturated phosphoric acid monomers and the like.

Representative examples of the unsaturated carboxylic acid monomers include acrylic acid, methacrylic acid, crotonic acid, itaconic acid, maleic acid, fumaric acid, citraconic acid, 2-methacryloyloxymethyl succinic acid, anhydrides and salts thereof, and the like. These monomers can be used alone or in admixture of at least two kinds.

Representative examples of the unsaturated sulfonic acid monomers include styrenesulfonic acid, 2-acrylamide-2-methylpropanesulfonic acid, 3-sulfopropyl (meth)acrylate, bis (3-sulfopropyl) itaconate, and salts thereof; sulfonic acid monoester of 2-hydroxyethyl (meth)acrylic acid, and salts thereof. These monomers can be used alone or in admixture of at least two kinds.

Representative examples of the unsaturated phosphoric acid monomers include vinylphosphonic acid, vinyl phosphate, bis(methacryloxyethyl) phosphate, diphenyl-2-acryloyloxyethyl phosphate, diphenyl-2-methacryloyloxyethyl phosphate, dibutyl-2-acryloyloxyethyl phosphate, dibutyl-2-methacryloyloxyethyl phosphate, dioctyl-2-(meth)acryloyloxyethyl phosphate and the like. These monomers can be used alone or in admixture of at least two kinds.

Representative examples of the monomer (c) copolymerizable with the alicyclic (meth)acrylate (a) and the salt-forming group-containing monomer (b) include (meth)acrylates such as methyl (meth)acrylate, ethyl (meth)acrylate, isopropyl (meth)acrylate, n-butyl (meth)acrylate, isobutyl (meth) acrylate, n-amyl (meth)acrylate, isoamyl (meth)acrylate, n-hexyl (meth)acrylate, 2-ethylhexyl (meth)acrylate, n-octyl (meth)acrylate, decyl (meth)acrylate and dodecyl (meth) acrylate; styrenic monomers such as styrene, vinyltoluene, 2-methylstyrene and chlorostyrene; hydroxyl group-containing (meth)acrylates such as 2-hydroxyethyl (meth)acrylate, 3-hydroxypropyl (meth)acrylate and polyethylene glycol (meth)acrylate; and the like.

The water-insoluble vinyl polymer is obtained by copolymerizing a monomer composition containing the alicyclic (meth)acrylate (a), the salt-forming group-containing monomer (b), and the monomer (c) copolymerizable with the alicyclic (meth)acrylate (a) and the salt-forming group-containing monomer (b) in the presence of a radical polymerization initiator.

The content of the alicyclic (meth)acrylate (a) in the monomer composition is preferably 25 to 75% by weight, more preferably 30 to 70% by weight; the content of the salt-forming group-containing monomer (b) in the monomer composition is preferably 5 to 20% by weight, more preferably 10 to 15% by weight; and the content of the monomer (c) copolymerizable with the alicyclic (meth)acrylate (a) and the salt-forming group-containing monomer (b) in the monomer composition is preferably 5 to 70% by weight, more preferably 15 to 60% by weight, from the viewpoints of maintaining the storage stability for a long period of time, solvent resistance, water resistance and character quality of the aqueous dispersion, and exhibiting printing reliability for a long period of time.

The method for polymerizing the monomer composition includes a bulk polymerization method, a solution polymerization method, a suspension polymerization method, an emulsion polymerization method and the like. Among these polymerization methods, the solution polymerization method is preferable. The solvent used for the solution polymerization method is not limited to specified ones and includes, for instance, toluene, methyl isobutyl ketone, methyl ethyl ketone, and the like.

A radical polymerization initiator used in the polymerization includes, for instance, azo compounds such as 2,2'-azobisisobutyronitrile, 2,2'-azobis(2,4-dimethylvaleronitrile), 2,2'-azobis(4-methoxy-2,4-dimethylvaleronitrile), dimethyl-2,2'-azobisbutyrate, 2,2'-azobis(2-methylbutyronitrile) and 1,1'-azobis(1-cyclohexanecarbonitrile); organic peroxides such as t-butyl peroctoate, dicumyl peroxide, di-t-butyl peroxide and dibenzoyl oxide; and the like. Among these initiators, azo compounds are preferable. The amount of the polymerization initiator is preferably 0.001 to 2.0% by mol, more preferably 0.01 to 1.0% by mol, of the monomer composition.

In the polymerization, a polymerization chain transfer agent can be used. Representative examples of the polymerization chain transfer agent include mercaptans such as octyl mercaptan, n-dodecyl mercaptan, t-dodecyl mercaptan, n-hexadecyl mercaptan, n-tetradecyl mercaptan, t-tetradecyl mercaptan and mercaptoethanol; xanthogenndisulfides such as dimethyl xanthogenndisulfide, diethyl xanthogenndisulfide and diisopropyl xanthogenndisulfide; thiuram disulfides such as tetramethyl thiuram disulfide, tetraethyl thiuram disulfide and tetrabutyl thiuram disulfide; halogenated hydrocarbons such as carbon tetrachloride and ethylene bromide; hydrocarbons such as pentaphenylethane; unsaturated cyclic hydrocarbon compounds such as acrolein, methacrolein, allyl alcohol, 2-ethylhexyl thioglycolate, terpinolene, α-terpinene, γ-terpinene, diterpene, α-methylstyrene dimer (preferably those containing 50 parts by weight or more of 2,4-diphenyl-4-methyl-1-pentene), 9,10-dihydroanthracene, 1,4-dihydronaphthalene, indene and 1,4-cyclohexadiene; unsaturated heterocyclic compounds such as xanthene and 2,5-dihydrofuran; and the like. Those polymerization chain transfer agents can be used alone or in admixture of at least two kinds.

The conditions for polymerizing the monomer composition cannot be absolutely determined because the conditions differ depending upon the type of the radical polymerization initiator, the monomers and the solvent, and the like. Usually, the reaction temperature is preferably 30° to 100° C., more preferably 50° to 80° C., and the reaction time is preferably 1 to 10 hours or so. Also, it is preferable that the atmosphere for polymerization is an inert gas such as nitrogen gas.

After the termination of the polymerization reaction, the copolymer can be isolated from the reaction mixture by a known method such as re-precipitation or solvent distillation. Also, the copolymer obtained can be purified to remove unreacted monomers and the like from the copolymer by the repeat of re-precipitation, membrane separation, a chromatographic method, an extraction method or the like.

The vinyl polymer is thus obtained. The weight-average molecular weight of the vinyl polymer is preferably 3000 to 100000, more preferably 5000 to 50000, from the viewpoint of dispersion stability of the vinyl polymer in the aqueous dispersion, and the viewpoint of long-lasting jetting stability of the water-based ink.

The hydrophobic dye may be any dye as long as it can be incorporated in the vinyl polymer. The present invention is not limited to the kind of the hydrophobic dye. The solubility at 20° C. of the hydrophobic dye in an organic solvent which is used for dissolving the hydrophobic dye when preparing an aqueous dispersion is preferably at least 2 g/L, more preferably 20 to 500 g/L.

The hydrophobic dye includes, for instance, oil-soluble dyes, disperse dyes, direct dyes, acid dyes, basic dyes and the like. Among them, oil-soluble dyes and disperse dyes are preferable because they can be satisfactorily incorporated in the vinyl polymer.

Representative examples of the oil-soluble dyes include black dyes such as C.I. Solvent Black 3, 7, 27, 29 and 34, Nigrosine black dyes; C.I. Solvent Yellow 14, 16, 19, 29, 30, 56, 82, 93 and 162; C.I. Solvent Red 1, 3, 8, 18, 24, 27, 43, 49, 51, 72, 73 109, 122, 132 and 218; C.I. Solvent Violet 3; C.I. Solvent Blue 2, 11 25, 35 and 70; C.I. Solvent Green 3 and 7; C.I. Solvent Orange 2; and the like, and the present invention is not limited to the exemplified ones.

Among the oil-soluble dyes, C.I. Solvent Yellow 29 and 30 are preferable as a yellow dye, C.I. Solvent Blue 70 is preferable as a cyan dye, C.I. Solvent Red 18 and 49 are preferable as a magenta dye, and C.I. Solvent Black 3 is preferable as a black dye.

Representative examples of commercially available oil-soluble dyes include Nubian Black PC-0850, Oil Black HBB, Oil Black 860, Oil Yellow 129, Oil Yellow 105, Oil Pink 312, Oil Red SB, Oil Scarlet 308, Vali Fast Blue 2606, Oil Blue BOS [hereinabove commercially available from Orient Chemical Co., Ltd. under these trade names]; Neopen Yellow 075, Neopen Mazenta SE1378, Neopen Blue 807, Neopen Blue FF4012, Neopen Cyan FF4238 [hereinabove commercially available from BASF under these trade names]; and the like.

Representative examples of the disperse dye include, but not limited to, C.I. Disperse Yellow 5, 42, 54, 64, 79, 82, 83, 93, 99, 100, 119, 122, 124, 126, 160, 184:1, 186, 198, 199, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; C.I. Disperse Green 6:1 and 9; and the like.

The amount of the hydrophobic dye in the aqueous dispersion of polymer particles of the water-insoluble vinyl polymer containing the hydrophobic dye (hereinafter referred to as aqueous dispersion of the vinyl polymer particles) is preferably 5 to 900 parts by weight, more preferably 10 to 400 parts by weight, based on 100 parts by weight of the resin solid content of the vinyl polymer, from the viewpoints of optical density and facilitating the incorporation of the dye into the polymer particles. It is preferable that the solid content in the aqueous dispersion of vinyl polymer particles is 5 to 50% by weight.

The solid content in the aqueous dispersion of vinyl polymer particles containing the hydrophobic dye in the water-based ink is preferably 0.5 to 30% by weight, more preferably 1 to 20% by weight, from the viewpoints of jetting stability and optical density.

It is preferable that the average particle diameter of the aqueous dispersion of the vinyl polymer particles containing the hydrophobic dye is 20 to 200 nm from the viewpoint of dispersion stability.

As a process for preparing the aqueous dispersion of the vinyl polymer particles containing the hydrophobic dye, for instance, a process comprising dissolving a water-insoluble vinyl polymer and a hydrophobic dye in an organic solvent, neutralizing the salt-forming group of the water-insoluble vinyl polymer, adding water to the resulting solution, dispersing the water-insoluble vinyl polymer in the solution, and thereafter distilling the organic solvent off is preferable.

As a neutralizing agent, an acid or a base can be used in accordance with the kind of the salt-forming group. The acid includes, for instance, but not limited to, inorganic acids such as hydrochloric acid and sulfuric acid; and organic acids such as acetic acid, propionic acid, lactic acid, succinic acid and glycollic acid. The base includes, for instance, but not limited to, tertiary amines such as trimethylamine and triethylamine, ammonia, sodium hydroxide, potassium hydroxide, and the like. The neutralization degree is not limited to specified ones. It is preferable that the neutralization degree is controlled so that the resulting aqueous dispersion of the vinyl polymer particles containing the hydrophobic dye becomes weakly acidic to weakly alkaline, for example, pH 4 to 10.

It is preferable that a water-soluble organic solvent is contained in the water-based ink of the present invention from the viewpoint of improving dry resistance.

The "water-soluble organic solvent" as referred to herein means an organic solvent which has a solubility at least 1% by weight for water at 25° C.

Examples of the water-soluble organic solvent include polyhydric alcohols such as ethylene glycol, diethylene glycol, glycerol, propylene glycol, 1,3-butanediol, 1,4-butanediol, 1,5-pentanediol, trimethylolpropane and trimethylolethane; nitrogen-containing cyclic compounds such as 2-pyrrolidone, γ-butyrolactam, urea and ethyleneurea; nitrogen-containing acyclic compounds such as acetamide and N-monomethylacetamide; and the like. These water-soluble organic solvents can be used alone or in admixture of at least two kinds. Among them, diethylene glycol, glycerol and 2-pyrrolidone are preferable.

The content of the water-soluble organic solvent in the water-based ink is not limited to specified ones, and it is preferable that the content is 5 to 30% by weight or so, from the viewpoint of dry resistance.

Additives such as a surfactant, a pH adjusting agent and an antiseptic can be used in the water-based ink of the present invention, as occasion demands, within a range which would not hinder the object of the present invention.

The water-based ink of the present invention further contains water as balance so that each ingredient is contained in a desired amount. The content of the water in the water-based ink is preferably 40 to 90% by weight.

EXAMPLES

The following examples further describe and demonstrate embodiments of the present invention. The examples are given solely for the purpose of illustration and are not to be construed as limitations of the present invention.

Preparation Examples 1 to 4

Nitrogen gas replacement was sufficiently carried out in a reaction vessel equipped with a dropping funnel and a Dimroth condenser. Thereafter, the reaction vessel was charged with 20 parts by weight of toluene, and vinyl monomers and a polymerization chain transfer agent in the kinds and amounts as listed in the column of "initially charged monomers" of Table 1, to give a mixed solution. Also, a dropping funnel was charged with vinyl monomers and a polymerization chain transfer agent in the kinds and amounts as listed in the column of "dropping monomers" of Table 1, 80 parts by weight of toluene and 2 parts by weight of 2,2'-azobis(2,4-dimethylvaleronitrile), to give a mixed solution.

The temperature of the mixed solution inside the reaction vessel was raised to 65° C. with stirring under nitrogen atmosphere, and the mixed solution inside the dropping funnel was gradually added dropwise to the reaction vessel over a period of 3 hours. After 2 hours passed from the termination of dropwise addition, a solution prepared by dissolving 0.3 parts by weight of 2,2'-azobis(2,4-dimethylvaleronitrile) in 6 parts by weight of toluene was added thereto. The mixture was further aged at 65° C. for 2 hours and then at 70° C. for 2 hours, to give a copolymer solution.

A part of the resulting solution of the crude polymer was dried at 105° C. for 2 hours under reduced pressure, to remove the solvent completely, thereby giving a dried product of crude polymer. The molecular weight of the dried product was determined by gel permeation chromatography using polystyrene as a standard substance, and tetrahydrofuran as a solvent. As a result, the weight-average molecular weight was about 20000.

To 25 parts by weight of the dried product obtained above were added 250 parts by weight of toluene and 25 parts by weight of a hydrophobic dye as shown in Table 1, to completely dissolve the dried product. Some of the salt-forming groups of the slightly water-soluble polymer were neutralized by addition of 12 parts by weight of an aqueous sodium hydroxide. To the solution were added 600 parts by weight of deionized water, and the resulting solution was stirred and then emulsified for 30 minutes by using a microfluidizer commercially available from Microfluidizer.

The resulting emulsified product was concentrated by removing the organic solvent at 60° C. under reduced pressure and further removing a part of water, to give an aqueous dispersion of dye-containing vinyl polymer particles (hereinafter referred to as aqueous dispersion) having a solid content of 20% by weight.

Comparative Preparation Example 1

The same procedures as in Preparation Example 1 were carried out except that isobornyl methacrylate was changed to lauryl methacrylate in Preparation Example 1, to give an aqueous dispersion.

Comparative Preparation Example 2

The same procedures as in Preparation Example 2 were carried out except that cyclohexyl methacrylate was changed to styrene in Preparation Example 2, to give an aqueous dispersion.

Examples 1 to 4 and Comparative Examples 1 and 2

Five parts by weight of the solids of the aqueous dispersion of hydrophobic dye-containing vinyl polymer particles obtained in Preparation Examples 1 to 4 and Comparative Preparation Example 1, 5 parts by weight of glycerol, 10 parts by weight of trimethylglycine, 3 parts by weight of ethylene glycol, 8 parts by weight of monobutoxy polyethylene glycol (number of moles of ethylene oxide added: 6), 0.2 parts by weight of polyethylene glycol lauryl ether [commercially available from Kao Corporation, under the trade name of EMULGEN 130G] and 68.7 parts by weight of purified water were mixed. The resulting aqueous dispersion was filtered through a membrane filter having an average pore size of 0.2 μm, to remove contaminants and coarse particles, thereby giving a water-based ink.

The physical properties of the inks obtained were evaluated in accordance with the following methods. The results are shown in Table 2.

<Evaluation Methods>

(1) Storage Stability of Aqueous Dispersion

Each of the aqueous dispersions obtained in Preparation Examples 1 to 4 was filled in a storage bottle made of a

TABLE 1

| | Preparation Example No. | | | |
| --- | --- | --- | --- | --- |
| | 1 | 2 | 3 | 4 |
| Initially Charged Monomers and Polymerization Chain Transfer Agent | Isobornyl Methacrylate (15) Methyl Methacrylate (12) Methacrylic Acid (3) 2-Mercaptoethanol (0.2) | Cyclohexyl Methacrylate (17) 2-Ethylhexyl Methacrylate (9) Methacrylic Acid (5) 2-Mercaptoethanol (0.2) | Isobornyl Methacrylate (17) Methyl Methacrylate (12) Methacrylic Acid (3) 2-Mercaptoethanol (0.2) | Adamantyl Methacrylate (15) Methyl Methacrylate (12) Methacrylic Acid (3) 2-Mercaptoethanol (0.2) |
| Dropping Monomers and Polymerization Chain Transfer Agent | Isobornyl Methacrylate (35) Methyl Methacrylate (28) Methacrylic Acid (7) 2-Mercaptoethanol (0.3) | Cyclohexyl Methacrylate (38) 2-Ethylhexyl Methacrylate (21) Methacrylic Acid (10) 2-Mercaptoethanol (0.3) | Isobornyl Methacrylate (38) Methyl Methacrylate (23) Methacrylic Acid (7) 2-Mercaptoethanol (0.3) | Adamantyl Methacrylate (35) Methyl Methacrylate (28) Methacrylic Acid (7) 2-Mercaptoethanol (0.3) |
| Hydrophobic Dye | Oil Yellow 129 [commercially available from Orient Chemical Co., Ltd., trade name] | Oil Yellow 129 [commercially available from Orient Chemical Co., Ltd., trade name] | Oil Pink 312 [commercially available from Orient Chemical Co., Ltd., trade name] | Neozapon Blue 807 [commercially available from BASF] |

Note:
The number in parentheses indicates the amount based on parts by weight.

fluororesin, and the state of the solution after 1 week of storage at 60° C. was evaluated on the basis of the following evaluation criteria.

(Evaluation Criteria)

| | |
|---|---|
| ○: | Floating particles and precipitated particles are not observed at all. |
| Δ: | Floating particles and precipitated particles are slightly observed. |
| ×: | A lot of floating particles and precipitated particles are observed. |

(2) Printing Reliability

Two thousand sheets of a document in the test format were continuously printed out on regenerated paper for PPC [commercially available from Nippon Kako Seishi K. K.], using an inkjet printer [commercially available from SEIKO EPSON CORPORATION, Model: EM-930 C], and thereafter the head portion of the ink cartridge was observed with naked eyes. Also, the appearances of printed characters (sharpness and blurriness) of the printouts were evaluated before and after the test, and evaluated on the basis of the following evaluation criteria.

(Evaluation Criteria)

| | |
|---|---|
| ○: | Adhesion of solids of the aqueous dispersion onto the printer head are not observed at all, and the printouts show sharpness and have no blurriness. |
| Δ: | Solids of the aqueous dispersion are slightly adhered on the printer head, or slight blurriness is found in the printouts |
| ×: | Solids of the aqueous dispersion are adhered on the printer head, or the printouts are illegible due to blurriness |

(3) Solvent Resistance

Each of the water-based inks obtained in Examples 1 to 4 was filled in a storage bottle made of a fluororesin, and the state of the solution after 1 week of storage at 60° C. was evaluated on the basis of the following evaluation criteria.

(Evaluation Criteria)

| | |
|---|---|
| ○: | Floating particles and precipitated particles are not observed at all. |
| Δ: | Floating particles and precipitated particles are slightly observed. |
| ×: | A lot of floating particles and precipitated particles are observed. |

(4) Water Resistance

Solid image printing was carried out on the above-mentioned regenerated paper for PPC by using the above-mentioned printer, and dried at 25° C. for 1 hour. Thereafter, the optical density of a specified part of a sample printed copy paper was determined. Subsequently, the printed copy paper was immersed in stand-still water for 10 seconds, and the paper was vertically lifted therefrom. After drying the paper in air at 25° C. for 24 hours, the optical density of the paper was evaluated at the same portion where the optical density was evaluated before immersing by the Macbeth densitometer commercially available from Macbeth Process Measurements Co., Model Number: RD914. The residual ratio of the optical density after immersion to the optical density before immersion was obtained by the equation: [Residual Ratio]

=([Optical Density after Immersion]÷[Optical Density before Immersion])×100.

The water resistance was evaluated on the basis of the following evaluation criteria.

(Evaluation Criteria)

| | |
|---|---|
| ⊙: | Residual ratio being not less than 95% |
| ○: | Residual ratio being not less than 80% and less than 95% |
| Δ: | Residual ratio being not less than 60% and less than 80% |
| ×: | Residual ratio being less than 60% |

(5) Character Quality

The quality of the printed characters obtained by carrying out text printing using the above printer and regenerated paper, was evaluated in accordance with the following evaluation criteria:

(Evaluation Criteria)

| | |
|---|---|
| ○: | Blotting of characters and feathering generated along paper fibers being not observed at all |
| Δ: | Either blotting of characters or feathering generated along paper fibers being observed |
| ×: | Both blotting of characters and feathering generated along paper fibers being observed |

TABLE 2

| | Example No. or Comparative Example No. | | | | | |
|---|---|---|---|---|---|---|
| | Ex. 1 | Ex. 2 | Ex. 3 | Ex. 4 | Com. Ex. 1 | Com. Ex. 2 |
| Storage Stability of Aqueous Dispersion | ○ | ○ | ○ | ○ | × | Δ |
| Printing Reliability | ○ | ○ | ○ | ○ | × | Δ |
| Solvent Resistance | ○ | ○ | ○ | ○ | × | × |
| Water Resistance | ⊙ | ⊙ | ○ | ⊙ | ○ | ○ |
| Character Quality | ○ | ○ | ○ | ○ | ○ | ○ |

It can be seen from the results shown in Table 2 that the aqueous dispersion obtained in each of the Examples is excellent in storage stability, and that the water-based ink obtained in each of the Examples is excellent in printing reliability, solvent resistance, water resistance and character quality.

As explained above, the aqueous dispersion of the present invention is excellent in, for instance, storage stability, and the ink is excellent in, for instance, printing reliability, solvent resistance, water resistance and character quality.

What is claimed is:

1. An aqueous dispersion for inkjet recording, comprising polymer particles of a water-insoluble vinyl polymer containing a hydrophobic dye, wherein said water-insoluble vinyl polymer is prepared by polymerizing a monomer composition comprising an alicyclic (meth)acrylate (a) which is isobornyl (meth)acrylate, a salt-forming group-containing monomer (b), and a monomer (c) copolymerizable with the alicyclic (meth)acrylate (a) and the salt-forming group-containing monomer (b)

wherein the content of the alicyclic (meth)acrylate (a) in the monomer composition is 25 to 75% by weight wherein said aqueous dispersion is prepared by dissolving said water-insoluble vinyl polymer and said hydrophobic dye in an organic solvent, ionizing said salt-forming group of the water-insoluble vinyl polymer, adding water to a resulting solution, dispersing said water-insoluble vinyl polymer in said solution, and thereafter distilling said organic solvent off.

2. The aqueous dispersion according to claim 1, wherein the weight-average molecular weight of the water-insoluble vinyl polymer is 3,000 to 100,000.

3. The aqueous dispersion according to claim 1, wherein said aqueous dispersion is prepared by dissolving said water-insoluble vinyl polymer and said hydrophobic dye in an organic solvent, ionizing said salt-forming group of the water-insoluble vinyl polymer, adding water to a resulting solution, dispersing said water-insoluble vinyl polymer in said solution, and thereafter distilling said organic solvent off.

4. The aqueous dispersion for inkjet recording according to claim 1, wherein said aqueous dispersion further comprises a water-soluble organic solvent.

5. A water-based ink for inkjet recording comprising said aqueous dispersion for inkjet recording according to claim 1.

6. A water-based ink for inkjet recording comprising said aqueous dispersion for inkjet recording according to claim 4.

7. The aqueous dispersion according to claim 1, wherein a content of said alicyclic (meth)acrylate (a) is 30 to 70% by weight.

8. The aqueous dispersion according to claim 1, wherein said monomer (c) is an acrylic ester.

9. The aqueous dispersion according to claim 1, wherein a content of said salt-forming group-containing monomer (b) is 5 to 20% by weight.

10. The aqueous dispersion according to claim 4, wherein said water-soluble organic solvent is contained in an amount of 5 to 30% by weight.

11. The aqueous dispersion according to claim 1, wherein said water-insoluble vinyl polymer is polymerized by a solution polymerization method.

12. The aqueous dispersion according to claim 1, wherein a content of said hydrophobic dye in said aqueous dispersion is 5 to 900 parts by weight based on 100 parts by weight of said resin solid contents of said vinyl polymer.

13. The aqueous dispersion according to claim 1, wherein a content of said hydrophobic dye in said aqueous dispersion is 10 to 400 parts by weight based on 100 parts by weight of said resin solid contents of said vinyl polymer.

14. The aqueous dispersion according to claim 1, wherein a solid content in said aqueous dispersion of said vinyl polymer particles is 0.5 to 30% by weight.

15. The aqueous dispersion according to claim 1, wherein a solid content in said aqueous dispersion of said vinyl polymer particles is 1 to 20% by weight.

16. An aqueous dispersion for inkjet recording, comprising polymer particles of a water-insoluble vinyl polymer containing a solid hydrophobic dye, wherein said water-insoluble vinyl polymer is prepared by polymerizing a monomer composition comprising an alicyclic (meth)acrylate (a) which is isobornyl (meth)acrylate, a salt-forming group-containing monomer (b), and a monomer (c) copolymerizable with the alicyclic (meth)acrylate (a) and the salt-forming group-containing monomer (b)

wherein the content of the alicyclic (meth)acrylate (a) in the monomer composition is 25 to 75% by weight wherein said aqueous dispersion is prepared by dissolving said water-insoluble vinyl polymer and said solid hydrophobic dye in an organic solvent, ionizing said salt-forming group of the water-insoluble vinyl polymer, adding water to a resulting solution, dispersing said water-insoluble vinyl polymer in said solution, and thereafter distilling said organic solvent off.

* * * * *